(12) United States Patent
Wang et al.

(10) Patent No.: US 9,682,691 B2
(45) Date of Patent: Jun. 20, 2017

(54) INITIATING PREPARATIONS FOR ENGINE AUTOSTOP PRIOR TO VEHICLE STOP

(75) Inventors: Xiaoyong Wang, Canton, MI (US); Ryan Abraham McGee, Ann Arbor, MI (US)

(73) Assignee: Ford Global Technologies, LLC, Detroit, MI (US)

( * ) Notice: Subject to any disclaimer, the term of this patent is extended or adjusted under 35 U.S.C. 154(b) by 1230 days.

(21) Appl. No.: 13/568,187

(22) Filed: Aug. 7, 2012

(65) Prior Publication Data

US 2014/0046577 A1 Feb. 13, 2014

(51) Int. Cl.
| | | |
|---|---|---|
| *B60W 10/10* | (2012.01) | |
| *B60W 10/06* | (2006.01) | |
| *B60W 10/30* | (2006.01) | |
| *F02D 41/04* | (2006.01) | |
| *F02N 11/08* | (2006.01) | |
| *B60W 50/00* | (2006.01) | |
| *B60W 30/18* | (2012.01) | |

(52) U.S. Cl.
CPC .......... *B60W 10/06* (2013.01); *B60W 10/10* (2013.01); *B60W 10/30* (2013.01); *B60W 30/181* (2013.01); *B60W 50/0097* (2013.01); *F02D 41/042* (2013.01); *F02N 11/0822* (2013.01); *B60W 2520/10* (2013.01); *B60W 2710/0683* (2013.01); *B60W 2710/1005* (2013.01); *B60W 2710/305* (2013.01); *F02N 2200/0801* (2013.01); *F02N 2200/101* (2013.01); *Y02T 10/48* (2013.01); *Y02T 10/84* (2013.01)

(58) Field of Classification Search
CPC .................................................... B60W 10/06
USPC .......................................... 701/54, 112, 113
See application file for complete search history.

(56) References Cited

U.S. PATENT DOCUMENTS

| | | | | |
|---|---|---|---|---|
| 2,705,944 | A * | 4/1955 | Powell ................... | F02D 17/04 123/198 B |
| 6,382,191 | B1 * | 5/2002 | Curran .................. | F02D 41/004 123/518 |
| 6,557,534 | B2 * | 5/2003 | Robichaux ............. | B60K 6/445 123/179.16 |
| 6,702,718 | B2 * | 3/2004 | Tani ...................... | F02D 41/042 477/203 |
| 7,383,119 | B2 * | 6/2008 | Lewis ...................... | F01L 9/04 123/345 |
| 7,458,353 | B2 * | 12/2008 | Takahashi ............... | F02D 17/04 123/179.3 |
| 7,503,413 | B2 | 3/2009 | Jiang et al. | |
| 7,647,920 | B2 * | 1/2010 | Amano .................... | B60K 6/48 123/519 |
| 7,967,720 | B2 * | 6/2011 | Martin .................... | B60K 6/365 123/520 |
| 8,160,804 | B2 * | 4/2012 | Chominsky ............. | F02D 41/08 123/179.4 |

(Continued)

*Primary Examiner* — J. Allen Shriver, II
*Assistant Examiner* — Travis Coolman
(74) *Attorney, Agent, or Firm* — David B. Kelley; Brooks Kushman P.C.

(57) ABSTRACT

A stop/start vehicle includes at least one controller that, in response to predicting a vehicle stop, initiates an engine pre-shutdown protocol such that vehicle subsystems begin to prepare for engine shutdown prior to a speed of the vehicle reaching approximately zero to reduce time between the speed of the vehicle reaching approximately zero and engine shutdown.

10 Claims, 2 Drawing Sheets

(56) References Cited

U.S. PATENT DOCUMENTS

| | | | |
|---|---|---|---|
| 8,672,809 B2* | 3/2014 | Saito | F02D 17/02 |
| | | | 477/101 |
| 8,857,418 B2* | 10/2014 | Coatesworth | F02D 17/04 |
| | | | 123/491 |
| 8,863,729 B2* | 10/2014 | Menke | B01D 53/04 |
| | | | 123/518 |
| 8,868,273 B2* | 10/2014 | Ueno | B60K 6/48 |
| | | | 180/65.23 |
| 9,145,864 B2* | 9/2015 | Kristinsson | F02N 11/0837 |
| 9,303,576 B2* | 4/2016 | Hashemi | F02D 41/0295 |
| 2002/0083930 A1* | 7/2002 | Robichaux | B60K 6/445 |
| | | | 123/520 |
| 2009/0025668 A1* | 1/2009 | Matsusaka | F01L 1/3442 |
| | | | 123/90.17 |
| 2013/0018564 A1* | 1/2013 | Coatesworth | F02D 17/04 |
| | | | 701/102 |
| 2013/0255614 A1* | 10/2013 | Kitano | F02D 29/02 |
| | | | 123/179.4 |

* cited by examiner

INITIATING PREPARATIONS FOR ENGINE AUTOSTOP PRIOR TO VEHICLE STOP

TECHNICAL FIELD

This disclosure relates to micro-hybrid or stop/start vehicles and initiating activities associated with engine shutdown prior to vehicle stop.

BACKGROUND

A micro-hybrid or stop/start vehicle can selectively turn its engine off during portions of a drive cycle to conserve fuel. As an example, a stop/start vehicle can turn its engine off while the vehicle is stopped rather than allow the engine to idle. The engine can then be restarted, for example, when a driver releases the brake pedal or steps on the accelerator pedal.

SUMMARY

A vehicle includes an engine, a vehicle component, and at least one controller. The at least one controller issues auto stop commands and auto start commands. The engine is shutdown in response to the auto stop commands and started in response to the auto start commands. The at least one controller, in response to predicting a vehicle stop, further initiates an engine pre-shutdown protocol such that the vehicle component begins to prepare for engine shutdown prior to a speed of the vehicle reaching approximately zero to reduce time between the speed of the vehicle reaching approximately zero and engine shutdown. The vehicle component may be an intake manifold in fluid communication with the engine and beginning to prepare for engine shutdown may include beginning a purge of the intake manifold. The vehicle component may be an electrical bus and beginning to prepare for engine shutdown may include beginning to reduce a voltage on the electrical bus to a predetermined value. The vehicle component may be an automatic transmission mechanically coupled with the engine and beginning to prepare for engine shutdown may include beginning to shift gears of the automatic transmission. The vehicle component may be an electric pump and beginning to prepare for engine shutdown may include beginning to activate the electric pump.

A stop/start vehicle includes an engine, an electrical bus, and at least one controller. The at least one controller initiates a reduction in voltage on the electrical bus to a predetermined value when a speed of the vehicle is greater than approximately zero and less than a predetermined speed. The at least one controller also initiates a stop of the engine after the speed of the vehicle is approximately zero and the voltage is approximately equal to the predetermined value. The stop/start vehicle may further include an intake manifold in fluid communication with the engine and the at least one controller may further initiate a purge of the intake manifold when the speed of the vehicle is greater than approximately zero and less than the predetermined speed. The stop/start vehicle may further include an automatic transmission mechanically coupled with the engine and the at least one controller may further initiate a shifting of gears of the automatic transmission when the speed of the vehicle is greater than approximately zero and less than the predetermined speed. The stop/start vehicle may further include an electric pump and the at least one controller may further initiate activation of the electric pump when the speed of the vehicle is greater than approximately zero and less than the predetermined speed.

A method for operating a stop/start vehicle includes in response to predicting a vehicle stop, initiating engine pre-shutdown preparations for at least one vehicle component prior to vehicle speed reaching approximately zero to reduce time between the vehicle speed reaching approximately zero and shutting down the engine. The method further includes in response to the vehicle speed reaching approximately zero and completion of the engine pre-shutdown preparations, shutting down the engine. The at least one vehicle component may be an intake manifold in fluid communication with the engine and initiating engine pre-shutdown preparations may include initiating a purge of the intake manifold. The at least one vehicle component may be an electrical bus and initiating engine pre-shutdown preparations may include initiating a reduction in voltage on the electrical bus to a predetermined value. The at least one vehicle component may be an automatic transmission mechanically coupled with the engine and initiating engine pre-shutdown preparations may include initiating a shifting of gears of the automatic transmission. The at least one vehicle component may be an electric pump and initiating engine pre-shutdown preparations may include initiating activation of the electric pump.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicle systems that are directly or indirectly influenced by operation of an engine are often prepared for an engine shutdown. That is, certain vehicle systems perform specified activities prior to engine shutdown. For example, an intake manifold may be purged to improve subsequent engine restart smoothness, a voltage on an electrical bus may be ramped down to reduce power consumption by electrical loads during engine off, an automatic transmission may shift gears in anticipation of vehicle launch after engine restart, an electric pump may be activated to maintain transmission line pressure during engine off, etc. Certain of these activities, such as purging the intake manifold, can be performed in fractions of a second while others, such as ramping down the voltage of the electrical bus, can take several seconds to complete. Hence, if these activities are initiated after vehicle speed has reached zero, valuable engine off time could be lost to pre-engine shut down protocols. Put another way, increasing the duration of time during which the engine is stopped while vehicle speed zero can increase fuel savings and emissions reductions.

Certain systems, methods, algorithms, etc. disclosed herein can predict vehicle stops during a drive cycle and initiate engine pre-shutdown protocols prior to vehicle speed reaching zero so that the engine can be off for longer periods of time while the vehicle speed is zero.

Figure 1:
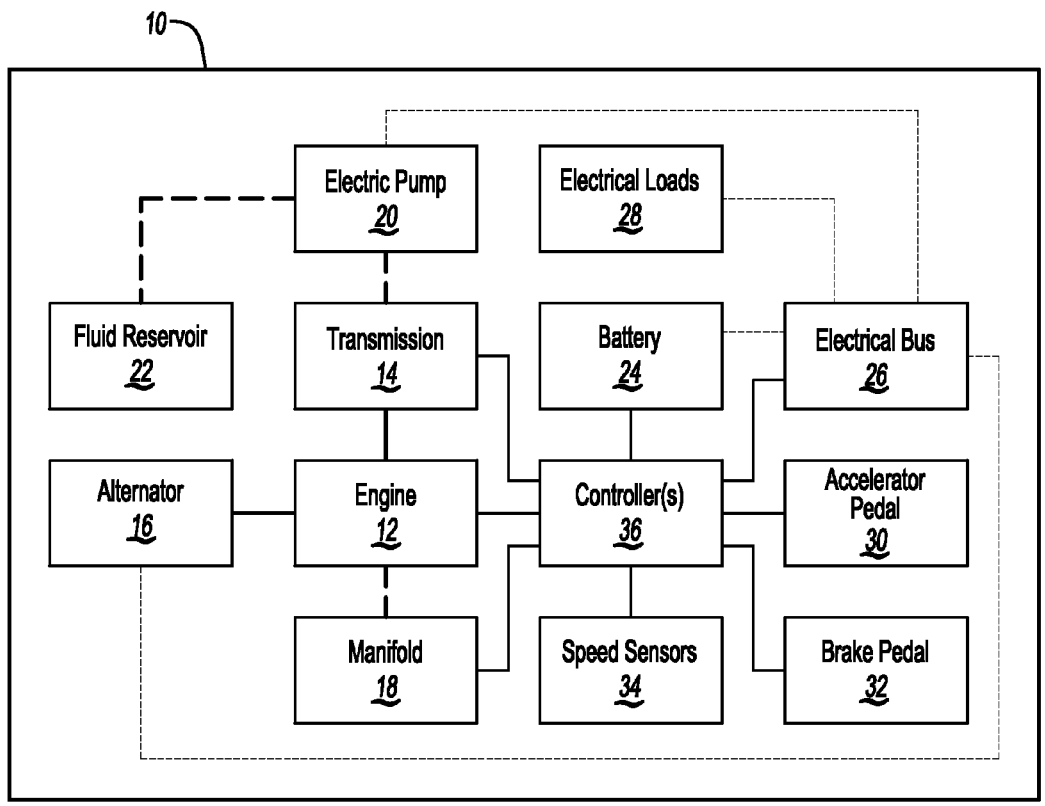
FIG. 1 is a block diagram of a stop/start vehicle.

Referring to FIG. 1, an automotive vehicle 10 includes an engine 12, a transmission 14 and an alternator 16 each mechanically coupled with the engine 12 as indicated by heavy solid line. The vehicle 10 also includes an intake manifold 18 in fluid communication with the engine 12, an electric pump 20 in fluid communication with the transmission 14, and a fluid reservoir 22 in fluid communication with electric pump 20 as indicated by heavy dashed line. The vehicle 10 further includes a battery 24, an electrical bus 26, electrical loads 28 (e.g., a resistive heating element, infotainment systems, etc.), an accelerator pedal 30, a brake pedal 32, vehicle speed sensors 34, and one or more controllers 36. The alternator 16, electric pump 20, battery 24, and electrical loads 28 are electrically connected with the electrical bus 26 as indicated by thin dashed line. The engine 12, transmission 14, manifold 18, battery 24, electrical bus 26, accelerator pedal 30, brake pedal 32, and speed sensors 34 are in communication with/under the control of the controllers 36 as indicated by thin solid line. Other vehicle arrangements, of course, are also possible.

The controllers (or stop/start system) 36 can issue auto stop commands (e.g., commands to stop the engine 12 during a drive cycle) and auto start commands (e.g., commands to start the engine 12 during a drive cycle). The engine 12 will be shutdown in response to auto stop commands and will be started in response to auto start commands as known in the art.

Figure 2:
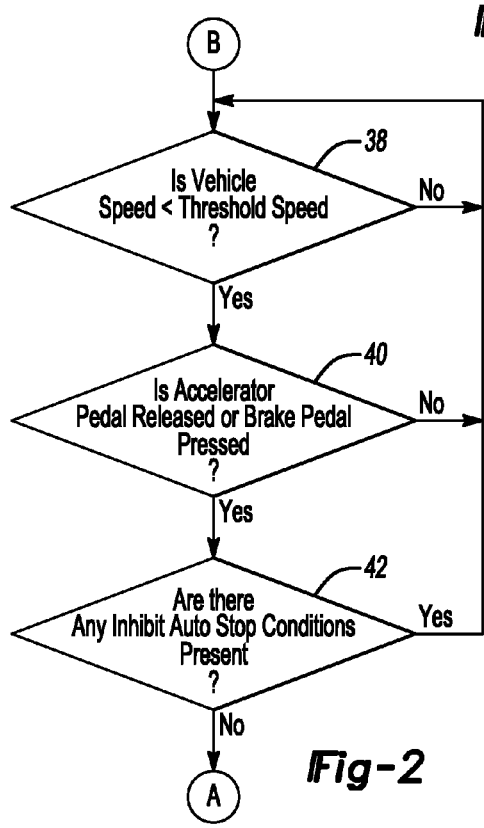
FIGS. 2, 3 and 4 are flowcharts illustrating portions of algorithms for controlling a stop/start vehicle.

Referring to FIGS. 1 and 2, it is determined whether vehicle speed is less than a threshold speed at operation 38. The controllers 36, for example, can compare speed data from the sensors 34 to some predetermined speed such as 5 miles per hour. If no, the algorithm returns to operation 38. If yes, it is determined whether an accelerator pedal is released or a brake pedal is pressed at operation 40. The controllers 36, for example, can determine whether position data associated with the accelerator pedal 30 and brake pedal 32 indicates that the accelerator pedal 30 is released or the brake pedal 32 is pressed. If no, the algorithm returns to operation 38. If yes, it is determined if there are any inhibit auto stop conditions present at operation 42. For example, the controllers 36 can check if any flags have been set to indicate that an auto stop of the engine 12 should be precluded. It may be determined in one instance that power demands by various vehicle subsystems exceed that which can be supported by the battery 24 alone. An auto stop inhibit flag is set in response. Other suitable/known auto stop inhibit conditions are also contemplated. If yes, the algorithm returns to operation 38.

Figure 3:
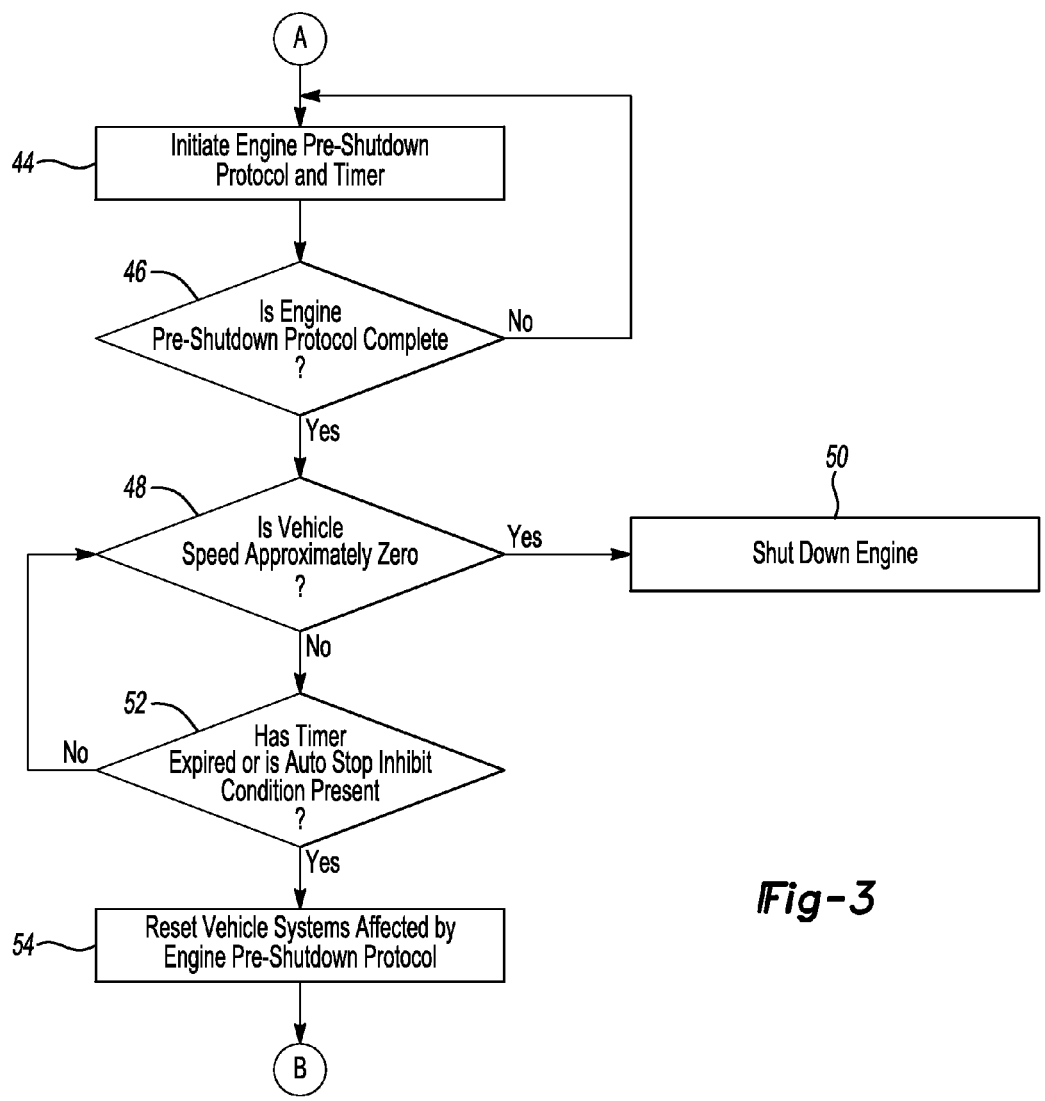

Referring to FIGS. 1 and 3, if no, engine pre-shutdown protocols for various vehicle components and a timer are initiated at operation 44. The controllers 36, for example, can cause the intake manifold 18 to be purged, the voltage on the electrical bus 26 to be reduced to some target value, the transmission 14 to be shifted, the electric pump 20 to be activated, etc. as mentioned above. Additionally, the controllers 36 can initiate a counter. At operation 46, it is determined whether the engine pre-shutdown protocols are complete. If no, the algorithm returns to operation 46. If yes, it is determined whether vehicle speed is approximately 0 at operation 48. For example, the controllers 36 can examine data from the sensors 34 to determine if it suggests that speed of the vehicle 10 is approximately 0. If yes, the engine is shutdown at operation 50. For example, the controllers 36 can cut fuel to the engine 12 and take other necessary steps to stop the engine 12 as known in the art. If no, it is determined whether the timer has expired or an auto stop inhibit condition is present at operation 52. The controllers 36, for example, can compare a current value of the counter to a threshold value. The controllers 36 also, for example, can check if any flags have been set to indicate that an auto stop of the engine 12 should be precluded as discussed above. If no, the algorithm returns to operation 48. If yes, the vehicle components affected by the engine pre-shutdown protocols are reset at operation 54. For example, the controllers 36 can cause the voltage on the electrical bus 26 to increase to the value it had prior to initiation of the engine pre-shutdown protocols, etc. The algorithm then returns to operation 38 (FIG. 2).

Figure 4:
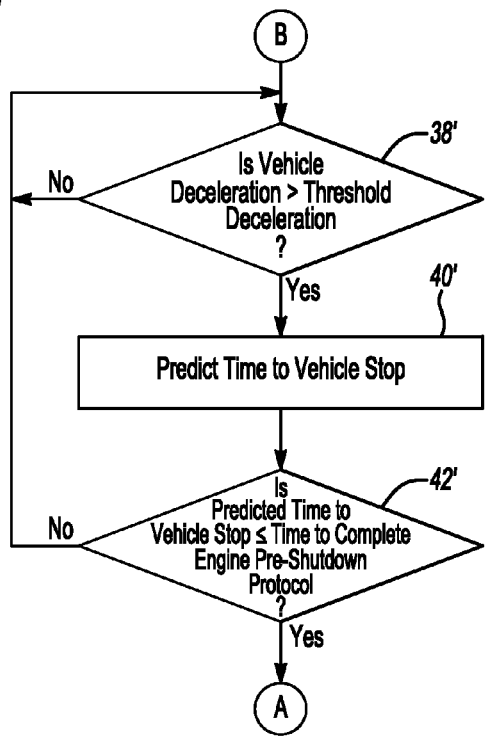

In other implementations, all of the operations of FIG. 2 need not be performed prior to initiating engine pre-shutdown protocols. Operations 40 and 42, as an example, could be omitted. Operation 40, as another example, could be omitted, etc. A similar comment applies to FIG. 3. A timer, for example, need not be used. Other scenarios are also possible. Referring to FIG. 4, for example, it is determined whether vehicle deceleration is greater than a threshold at operation 38'. For example, the controllers 36 can derive deceleration based on speed data from the sensors 34 and compare it to a threshold value such as 10 meters per second. If no, the algorithm returns to operation 38'. If yes, time to vehicle stop is predicted at operation 40'. The controllers 36, for example, can derive predicted time to stop based on the speed data and the deceleration (e.g., current vehicle speed÷current vehicle deceleration=predicted time to vehicle stop). At operation 42', it is determined whether predicted time to vehicle stop is less than or equal to time to complete engine pre-shutdown protocol. Testing, simulation, etc. may be used to determine the time required to complete the engine pre-shutdown protocol for each affected vehicle component. As an example, the time required to reduce the voltage on the electrical bus from a current value to the desired value may be measured. As another example, the time to purge the intake manifold 18 may be measured. The vehicle component requiring the longest time to complete engine pre-shutdown activities may be used as the time to complete engine pre-shutdown protocol. The controllers 36 can, for example, compare the predicted time to vehicle stop to the time to complete engine pre-shutdown protocol. If no, the algorithm returns to operation 38'. If yes, the algorithm proceeds to operation 44 (FIG. 3).

The processes, methods, or algorithms disclosed herein may be deliverable to/implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an engine;
   a vehicle component; and
   at least one controller configured to, in response to predicting a vehicle stop,
      initiate an engine pre-shutdown protocol for the vehicle component, prior to a speed of the vehicle reaching zero and prior to receiving a command to initiate engine auto-shutdown, at a time selected to permit completion of the engine pre-shutdown protocol prior to the speed reaching zero, and
      initiate the engine auto-shutdown after the speed reaches approximately zero.

2. The vehicle of claim 1 wherein the vehicle component is an intake manifold in fluid communication with the engine and wherein initiating the engine pre-shutdown protocol includes initiating a purge of the intake manifold.

3. The vehicle of claim 1 wherein the vehicle component is an electrical bus and wherein initiating the engine pre-shutdown protocol includes initiating a reduction of a voltage on the electrical bus to a predetermined value.

4. The vehicle of claim 1 wherein the vehicle component is an automatic transmission mechanically coupled with the engine and wherein initiating the engine pre-shutdown protocol includes initiating a shifting of gears of the automatic transmission.

5. The vehicle of claim 1 wherein the vehicle component is an electric pump and wherein initiating the engine pre-shutdown protocol includes initiating an activation of the electric pump.

6. A stop/start method comprising:
   in response to predicting a vehicle stop, initiating engine pre-shutdown preparations for at least one vehicle component, prior to vehicle speed reaching zero and prior to receiving a command to shut down the engine, at a time selected to permit completion of the engine pre-shutdown preparations prior to the vehicle speed reaching zero; and
   in response to the vehicle speed reaching approximately zero, shutting down the engine.

7. The method of claim 6 wherein the at least one vehicle component is an intake manifold in fluid communication with the engine and wherein initiating engine pre-shutdown preparations includes initiating a purge of the intake manifold.

8. The method of claim 6 wherein the at least one vehicle component is an electrical bus and wherein initiating engine pre-shutdown preparations includes initiating a reduction in voltage on the electrical bus to a predetermined value.

9. The method of claim 6 wherein the at least one vehicle component is an automatic transmission mechanically coupled with the engine and wherein initiating engine pre-shutdown preparations includes initiating a shifting of gears of the automatic transmission.

10. The method of claim 6 wherein the at least one vehicle component is an electric pump and wherein initiating engine pre-shutdown preparations includes initiating an activation of the electric pump.

* * * * *